US010165486B2

United States Patent
Li et al.

(10) Patent No.: US 10,165,486 B2
(45) Date of Patent: Dec. 25, 2018

(54) MULTIPLE-COMMUNICATIONS-STANDARD TRANSMISSION METHOD AND APPARATUS

(71) Applicant: Huawei Technologies Co., Ltd., Shenzhen (CN)

(72) Inventors: Yungang Li, Kanata (CA); Rui Ni, Shenzhen (CN); Chenghui Peng, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/414,753

(22) Filed: Jan. 25, 2017

(65) Prior Publication Data

US 2017/0135014 A1 May 11, 2017

Related U.S. Application Data

(63) Continuation of application No. PCT/CN2014/083302, filed on Jul. 30, 2014.

(51) Int. Cl.
*H04W 36/18* (2009.01)
*H04W 48/18* (2009.01)
(Continued)

(52) U.S. Cl.
CPC ........ *H04W 36/18* (2013.01); *H04W 36/0011* (2013.01); *H04W 48/18* (2013.01);
(Continued)

(58) Field of Classification Search
CPC ... H04W 36/18; H04W 48/18; H04W 84/042; H04W 84/12; H04W 88/10
See application file for complete search history.

(56) References Cited

U.S. PATENT DOCUMENTS

| 6,073,015 A | 6/2000 | Berggren et al. |
| 2011/0182273 A1 | 7/2011 | George et al. |

(Continued)

FOREIGN PATENT DOCUMENTS

| CN | 101626554 A | 1/2010 |
| CN | 102609326 A | 7/2012 |

(Continued)

OTHER PUBLICATIONS

3rd Generation Partnership Project; Technical Specification Group Services and System Aspects; Mobility between 3GPP-Wireless Local Area Network (WLAN) Interworking and 3GPP Systems (Release 11), 3 GPP TS 23.327, V11.0.0, Mar. 2012, 27 pages.

*Primary Examiner* — Nay A Maung
*Assistant Examiner* — Angelica M Perez
(74) *Attorney, Agent, or Firm* — Slater Matsil, LLP

(57) ABSTRACT

Embodiments disclose a multiple-communications-standard transmission method and apparatus. The method includes when both a WLAN communications standard and a wireless cellular communications standard are available, sending, by a transmit end supporting multiple communications standards by preferentially using the WLAN communications standard, a service flow of a service session to a receive end supporting multiple communications standards. The method also includes in response to that a first switch condition is met, switching, by the transmit end at a data link layer, to using the wireless cellular communications standard for continuous transmission of the service flow, where the first switch condition includes at least that a WLAN communication link fails in communication.

14 Claims, 11 Drawing Sheets

(51) Int. Cl.
*H04W 36/00* (2009.01)
*H04W 76/15* (2018.01)
*H04W 84/04* (2009.01)
*H04W 84/12* (2009.01)
*H04W 88/10* (2009.01)
*H04W 76/19* (2018.01)

(52) U.S. Cl.
CPC ............ H04W 76/15 (2018.02); *H04W 76/19* (2018.02); *H04W 84/042* (2013.01); *H04W 84/12* (2013.01); *H04W 88/10* (2013.01)

(56) References Cited

U.S. PATENT DOCUMENTS

| | | | |
|---|---|---|---|
| 2012/0140651 A1* | 6/2012 | Nicoara | H04W 48/18 370/252 |
| 2016/0205578 A1* | 7/2016 | Lee | H04W 24/10 455/442 |

FOREIGN PATENT DOCUMENTS

| | | |
|---|---|---|
| CN | 202663551 U | 1/2013 |
| CN | 103024844 A | 4/2013 |
| CN | 103533593 A | 1/2014 |

* cited by examiner

MULTIPLE-COMMUNICATIONS-STANDARD TRANSMISSION METHOD AND APPARATUS

CROSS-REFERENCE TO RELATED APPLICATIONS

This application is a continuation of International Patent Application No. PCT/CN2014/083302, filed on Jul. 30, 2014, the disclosure of which is hereby incorporated by reference in its entirety.

TECHNICAL FIELD

The present embodiments relate to the field of communications technologies, and more specifically, to a multiple-communications-standard transmission method and apparatus.

BACKGROUND

With rapid development of communications technologies and popularization of intelligent user terminals, a user terminal can be connected to either a wireless cellular network or a wireless local area network (WLAN).

The user terminal may select, according to a specified policy, a specific communications standard to perform data communication separately. In a separate operation process by using a WLAN standard (for example, a WiFi technology), a WLAN communication link fails in communication because a shared radio channel is busy, or a like reason, causing an unstable transmission speed.

However, switching from a WLAN communications standard to a wireless cellular communications standard is confronted with another problem:

If a user terminal and an Internet service server are considered as two ends of a user service flow, the service flow uses entirely different internet protocol (IP) addresses and routing paths when the service flow is switched between different communications standards. The changes of the IP addresses and routing paths result in unavoidable interruption of the service flow, such as video freezing, web page reopening, and voice call interruption.

SUMMARY

In view of this, a purpose of embodiments is to provide a multiple-communications-standard transmission method and apparatus, so as to resolve a problem that a transmission speed by using only a wireless local area network (WLAN) communications standard is unstable, and that a service flow is temporarily interrupted when being switched between different communications standards.

To achieve the foregoing purpose, the embodiments provide the following technical solutions:

According to a first aspect of embodiments, a multiple-communications-standard transmission method is provided, including when both a WLAN communications standard and a wireless cellular communications standard are available, sending, by a transmit end supporting multiple communications standards by preferentially using the WLAN communications standard, a service flow of a service session to a receive end supporting multiple communications standards. The method also includes in response to that a first switch condition is met, switching, by the transmit end at a data link layer, to using the wireless cellular communications standard for continuous transmission of the service flow, where the first switch condition includes at least that a WLAN communication link fails in communication.

With reference to the first aspect, in a first possible implementation manner, the method further includes: in response to that a second switch condition is met, switching, by the transmit end at the data link layer, from using the wireless cellular communications standard to using the WLAN communications standard for continuous transmission of the service flow, where the second switch condition includes at least that the WLAN communication link recovers from a communication failed state to a transmission available state.

With reference to the first aspect or the first possible implementation manner of the first aspect, in a second possible implementation manner, the switching, by the transmit end at a data link layer, to using the wireless cellular communications standard for continuous transmission of the service flow includes: switching, by the transmit end, the service flow from a data link layer of the WLAN communication link to a data link layer of a wireless cellular communication link, so that the service flow is continuously transmitted by the wireless cellular communication link.

With reference to the first possible implementation manner of the first aspect, in a third possible implementation manner, the switching, by the transmit end at the data link layer, from using the wireless cellular communications standard to using the WLAN communications standard for continuous transmission of the service flow includes: switching, by the transmit end, the service flow from a data link layer of a wireless cellular communication link to a data link layer of the WLAN communication link, so that the service flow is continuously transmitted by the WLAN communication link.

With reference to any one of the first aspect to the third possible implementation manner of the first aspect, in a fourth possible implementation manner, before the transmit end sends the service flow of the service session to the receive end by preferentially using the WLAN communication link, the method further includes: establishing, by the transmit end, a session connection.

With reference to the fourth possible implementation manner of the first aspect, in a fifth possible implementation manner, the establishing a session connection includes: respectively creating, by the transmit end, traffic identifiers and contexts of the service flow at the data link layer of the WLAN communication link and the data link layer of the wireless cellular communication link.

With reference to the fifth possible implementation manner of the first aspect, in a sixth possible implementation manner, the establishing a session connection further includes: pre-applying, by the transmit end, for a physical layer transmission resource for the wireless cellular communications standard.

With reference to any one of the first aspect to the sixth possible implementation manner of the first aspect, in a seventh possible implementation manner, before the wireless cellular communication link performs continuous transmission, the method further includes: performing, by the transmit end, matched mapping between a link performance parameter of the WLAN communications standard and a link performance parameter of the wireless cellular communications standard.

With reference to any one of the fourth possible implementation manner of the first aspect to the seventh possible implementation manner of the first aspect, in an eighth possible implementation manner, before the establishing a session connection, the method further includes: communicating, by the transmit end, with the receive end to determine whether both parties support multiple communications standards, where the step that the transmit end supporting the multiple communications standards sends, by preferentially using the WLAN communications standard, the service flow of the service session to the receive end supporting the multiple communications standards is executed after it is determined that both parties support the multiple communications standards.

With reference to the eighth possible implementation manner of the first aspect, in a ninth possible implementation manner, after it is determined that both parties support the multiple communications standards, and before the session connection is established, the method further includes: allocating, by the transmit end, storage space to the service flow from a multiple-communications-standard shared storage area, and setting a public flag bit for the service flow, where the shared storage area can be accessed by the data link layer of the transmit end, and to-be-sent data, of the service flow, that is processed by a higher layer is placed in the storage space; and the public flag bit can be accessed by the data link layer of the transmit end, and the public flag bit includes at least a transmission flag bit, where a first value of the transmission flag bit is used to identify that the service flow is completely transmitted, a second value of the transmission flag bit is used to identify that the service flow is not completely transmitted, and the first value is unequal to the second value.

With reference to the ninth possible implementation manner of the first aspect, in a tenth possible implementation manner, the method further includes: deleting, by the transmit end in response to an ACK feedback, the corresponding to-be-sent data from the storage space.

With reference to any one of the first aspect to the tenth possible implementation manner of the first aspect, in an eleventh possible implementation manner, the method further includes: monitoring, by the transmit end in real time, whether the WLAN communication link fails in communication.

According to a second aspect of embodiments, a multiple-communications-standard transmission apparatus is provided, including: a selection unit, configured to: when both a WLAN communications standard and a wireless cellular communications standard are available, send, by preferentially using the WLAN communications standard, a service flow of a service session to a receive end supporting multiple communications standards; and a first switch unit, configured to: in response to that a first switch condition is met, switch, at a data link layer, to using the wireless cellular communications standard for continuous transmission of the service flow, where the first switch condition includes at least that a WLAN communication link fails in communication.

With reference to the second aspect, in a first possible implementation manner of the second aspect, the apparatus further includes: a second switch unit, configured to: in response to that a second switch condition is met, switch, at the data link layer, from using the wireless cellular communications standard to using the WLAN communications standard for continuous transmission of the service flow, where the second switch condition includes at least that the WLAN communication link recovers from a communication failed state to a transmission available state.

With reference to the second aspect or the first possible implementation manner of the second aspect, in a second possible implementation manner of the second aspect, the apparatus further includes: a session establishment unit, configured to establish a session connection before the selection unit sends the service flow of the service session to the receive end by preferentially using the WLAN communication link.

With reference to the second aspect, or the first possible implementation manner of the second aspect, or the second possible implementation manner of the second aspect, in a third possible implementation manner of the second aspect, the apparatus further includes: a matched mapping unit, configured to perform matched mapping between a link performance parameter of the WLAN communications standard and a link performance parameter of the wireless cellular communications standard before the wireless cellular communication link performs continuous transmission.

With reference to the second possible implementation manner of the second aspect or the third possible implementation manner of the second aspect, in a fourth possible implementation manner of the second aspect, the apparatus further includes: a negotiation unit, configured to communicate, before the session connection is established, with the receive end to determine whether both parties support multiple communications standards; where the selection unit sends, by preferentially using the WLAN communications standard and after it is determined that both parties support the multiple communications standards, the service flow of the service session to the receive end supporting the multiple communications standards.

With reference to the fourth possible implementation manner of the second aspect, in a fifth possible implementation manner of the second aspect, the apparatus further includes: a setting unit, configured to: after it is determined that both parties support the multiple communications standards and before the session connection is established, allocate storage space to the service flow from a multiple-communications-standard shared storage area, and set a public flag bit for the service flow, where the shared storage area can be accessed by the data link layer of the transmit end, and to-be-sent data, of the service flow, that is processed by a higher layer is placed in the storage space; and the public flag bit can be accessed by the data link layer of the transmit end, and the public flag bit includes at least a transmission flag bit, where a first value of the transmission flag bit is used to identify that the service flow is completely transmitted, a second value of the transmission flag bit is used to identify that the service flow is not completely transmitted, and the first value is unequal to the second value.

With reference to the fifth possible implementation manner of the second aspect, in a sixth possible implementation manner of the second aspect, the apparatus further includes: a deletion unit, configured to delete, in response to an ACK feedback, the corresponding to-be-sent data from the storage space.

With reference to any one of the second aspect to the sixth possible implementation manner of the second aspect, in a seventh possible implementation manner of the second aspect, the apparatus further includes: a monitoring unit, configured to monitor in real time whether the WLAN communication link fails in communication.

It can be learned that, in the embodiments, a service flow is transmitted by preferentially using a WLAN communications standard. When the WLAN communication link fails in communication, the service flow is continuously transmitted by using a wireless cellular communications standard. Using the reliable and stable wireless cellular communications standard to complement deficiency of the WLAN communications standard may effectively overcome a problem that a WLAN technology itself results in an unstable transmission rate because a shared radio channel is busy, and the like.

Moreover, in the embodiments, switching of the communications standard is performed at a data link layer below an internet protocol (IP) layer, and therefore, does not change or does not need to change an IP address and an IP routing path, thereby avoiding a phenomenon that the service flow is interrupted because of the changes of the IP address and the IP routing path.

BRIEF DESCRIPTION OF THE DRAWINGS

To describe the technical solutions in the embodiments more clearly, the following briefly describes the accompanying drawings required for describing the embodiments or the prior art. Apparently, the accompanying drawings in the following description show merely some embodiments, and persons of ordinary skill in the art may still derive other drawings from these accompanying drawings without creative efforts.

DETAILED DESCRIPTION OF ILLUSTRATIVE EMBODIMENTS

Figure 1A:
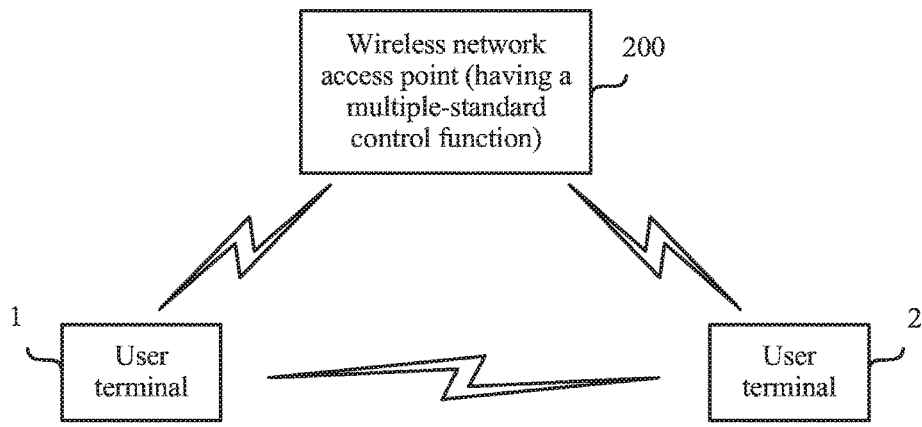
FIG. 1a to FIG. 1d are schematic diagrams of a multiple-communications-standard wireless network according to an embodiment.

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

Multiple communications standards mentioned in all implementation manners include but are not limited to communications standards such as GSM (Global System for Mobile Communications), CDMA (Code Division Multiple Access), WCDMA (Wideband Code Division Multiple Access), LTE (Long Term Evolution), a future fifth generation (5G) network standard, wireless local area network (WLAN), WiMAX (Worldwide Interoperability for Microwave Access), WiFi (Wireless-Fidelity), Bluetooth, and infrared. The GSM, CDMA, WCDMA, and LTE may be collectively referred to as a wireless cellular communications standard.

To adapt to a differentiated requirement for multiple communications standards or multiple connections of a user terminal, a wireless network is accelerating to development of a heterogeneous convergence of a wireless cellular network and a wireless local area network.

An existing wireless communications network convergence architecture is constituted by two parts: a core network (CN) and an access network (RAN).

The core network is specifically constituted by a control plane, a user plane, and a user information database. The control plane and the user plane are formed by network elements, such as a gateway general purpose radio service (GPRS) support node (GGSN)/a packet data gateway (PDG), a serving GPRS support node (SGSN), and a serving gateway (SGW). The user information database is formed by auxiliary network elements, such as a home subscriber server (HSS), a policy and charging rules function unit (PCRF), an authentication, authorization and accounting server (AAA Server), and an access network discovery and selection function unit (ANDSF).

The access network includes a wireless cellular network constituted by a base station controller (BSC), a radio network controller (RNC), a base transceiver station (BTS), a NodeB, an evolved NodeB eNodeB, and the like, and includes a WLAN network formed by WLAN access points (AP).

In addition, another convergence solution of the wireless cellular network and the WLAN network is to add one wireless fidelity controller (WFC) in the RAN. The WFC communicates, by using a set of self-defined interfaces, with a BSC of a 2nd generation wireless cellular network, an RNC of a 3rd generation wireless cellular network, and a mobility management entity (MME) of a 4th generation wireless cellular network.

In the prior art, convergence solutions of the wireless cellular network and the wireless local area network are network convergence manners operating at a network layer and above. A network convergence node is the GGSN/PDG or the WFC.

Refer to FIG. 1a to FIG. 1d. FIG. 1a to FIG. 1d are simple schematic diagrams of a multiple-communications-standard wireless network proposed in an embodiment. The wireless network includes a wireless network access point 200, a terminal 1, and a terminal 2 (another terminal or another network node is not shown). At least one device in the wireless network includes control functions of multiple standards provided in this implementation manner. Particularly, a device serving as a transmit end in the wireless network has the control functions of multiple standards.

As shown in FIG. 1a, the wireless network access point 200 that has the control functions of multiple standards may perform uniform communication with the terminal 1 and the terminal 2 by using different standards. The terminal 1 and the terminal 2 may have only a multiple-standard communication function, but not have the control functions of multiple standards.

The wireless network access point 200 may integrate a function of a wireless cellular network access device (for example, a base station controller/a wireless network controller and a base transceiver station/a base station/an evolved NodeB) and a function of a WLAN access point.

Figure 1B:
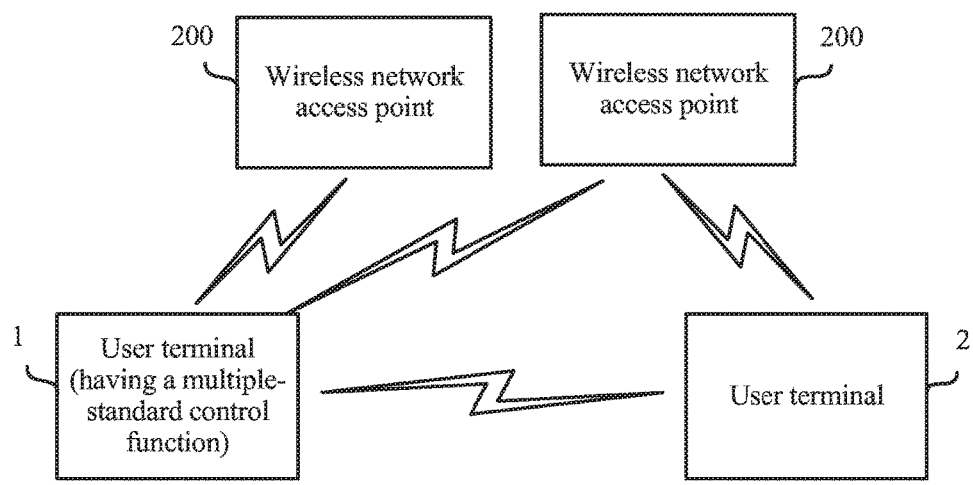

As shown in FIG. 1b, the terminal 1 that has the control functions of multiple standards may perform uniform communication with the different-standard wireless network access point 200.

Figure 1C:
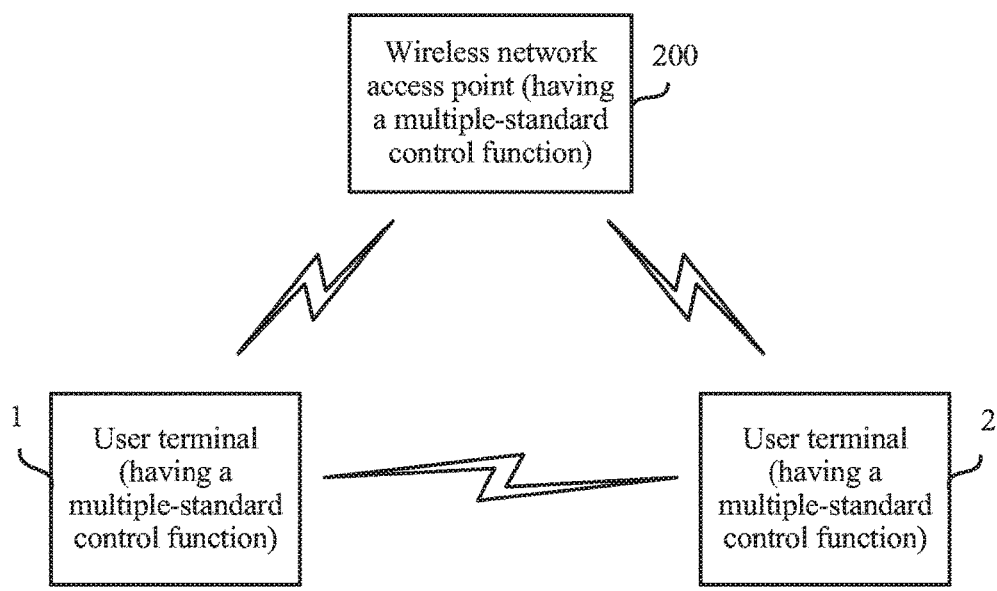

As shown in FIG. 1c, all of the wireless network access point 200, the terminal 1, and the terminal 2 may have the control functions of multiple standards.

Figure 1D:
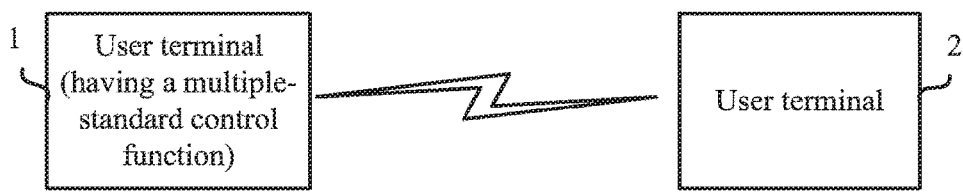

As shown in FIG. 1d, the wireless network may include only the terminal 1 that has the control functions of multiple standards and the terminal 2 (which may not have the control functions of multiple standards, but have only a multiple-standard communication function). The terminal 1 and the terminal 2 may perform direct multiple-standard wireless communication according to the implementation manner provided in the present embodiments.

The device that has the control functions of multiple standards may include two or more independent wireless-access-standard physical layers and two or more independent wireless-access-standard data link layers. Moreover, the device further includes an independent convergence control layer. There is an interface between the convergence control layer and the data link layer of each communications standard, and a high-speed interconnect interface is also established between the data link layers of all communications standards. Using the interface between the convergence control layer and the data link layer enables a control operation (for example, switching) to be responded and executed between multiple communications standards at a high speed. Both the data link layer and the convergence control layer have an interface to connect to a network layer, or the convergence control layer has an interface to connect to a network layer.

Figure 2A:
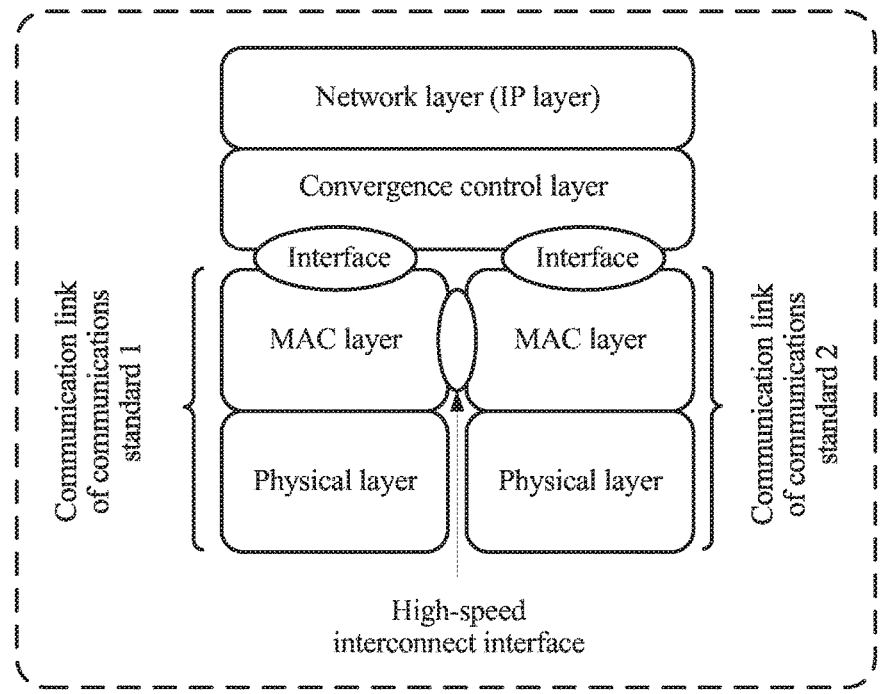
FIG. 2a to FIG. 2c are schematic diagrams of a protocol layer according to an embodiment.
Figure 2B:
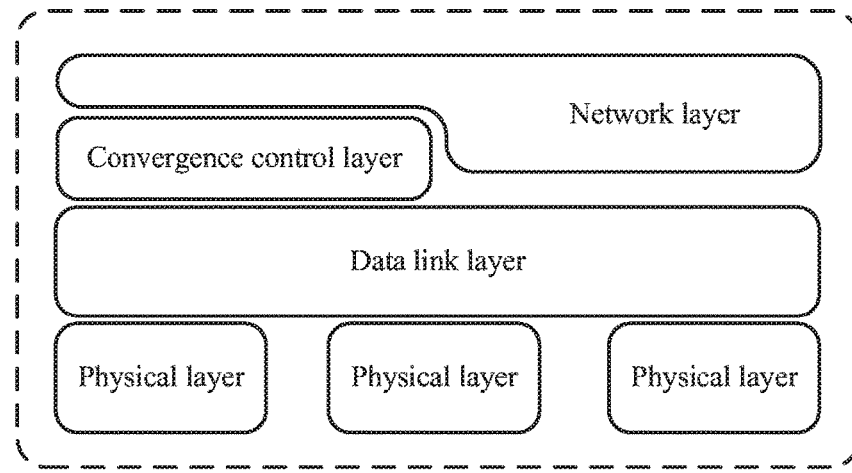
Figure 2C:
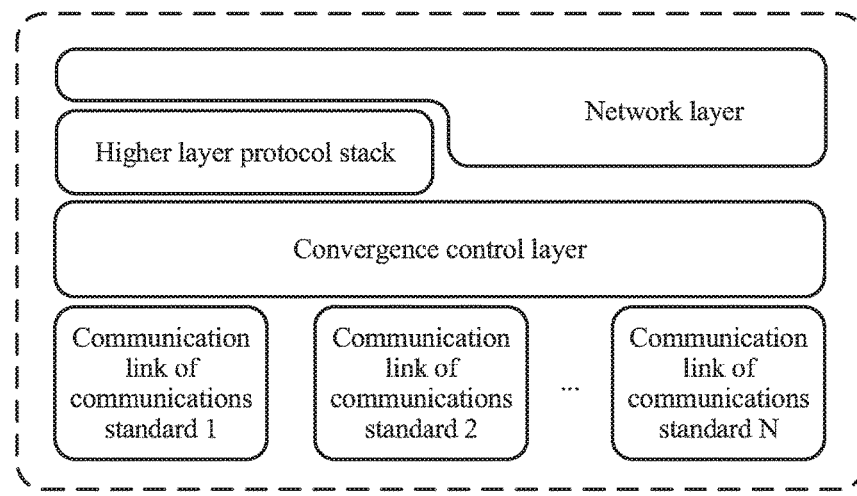

Refer to FIG. 2a to FIG. 2C. FIG. 2a to FIG. 2C are simple schematic diagrams of a protocol layer in an implementation manner, which are used to describe working principles of the protocol layer.

A device that has a control functions of multiple standards shown in FIG. 2a includes two or more mutually independent physical layers to support a physical-layer part of multiple-communications-standard wireless communication, and includes two or more mutually independent data link layers. A physical layer and a data link layer that are of each communications standard may be collectively referred to as a communication link. There is one uniform convergence control layer above all the data link layers, and the convergence control layer has an interface to connect to a network layer (an IP layer).

Data link layers of different communication links shown in FIG. 2a collaboratively operate by using a high-speed interconnect interface. This may achieve a logically uniform effect of a media access control (MAC) layer.

Alternatively, referring to FIG. 2b, there may also be only one physical MAC layer. That is, a new data link layer is obtained after the data link layers of multiple communications standards are converged.

In addition, there may be one high-speed shared storage area (shared memory) below the convergence control layer and between the data link layers. The foregoing shared storage area may be simultaneously accessed (access may include read and write) by the data link layers of multiple communications standards.

Referring to FIG. 2c, there may further be a higher layer protocol stack between the convergence control layer and the network layer. An LTE mobile phone is used as an example. The higher layer protocol stack may include the RLC (Radio Link Control), the PDCP (Packet Data Convergence Protocol), the RRC (Radio Resource Control), and an NAS (Non-access stratum).

However, for a wireless network access point serving as an LTE NodeB, the higher layer protocol stack may include the RLC, the PDCP, and the RRC.

The convergence control layers in FIG. 2a to FIG. 2c are centralized. In addition, a convergence control layer may further be decentralized, and may be combined with the data link layer of each communications standard (as shown in FIG. 3).

Figure 3:
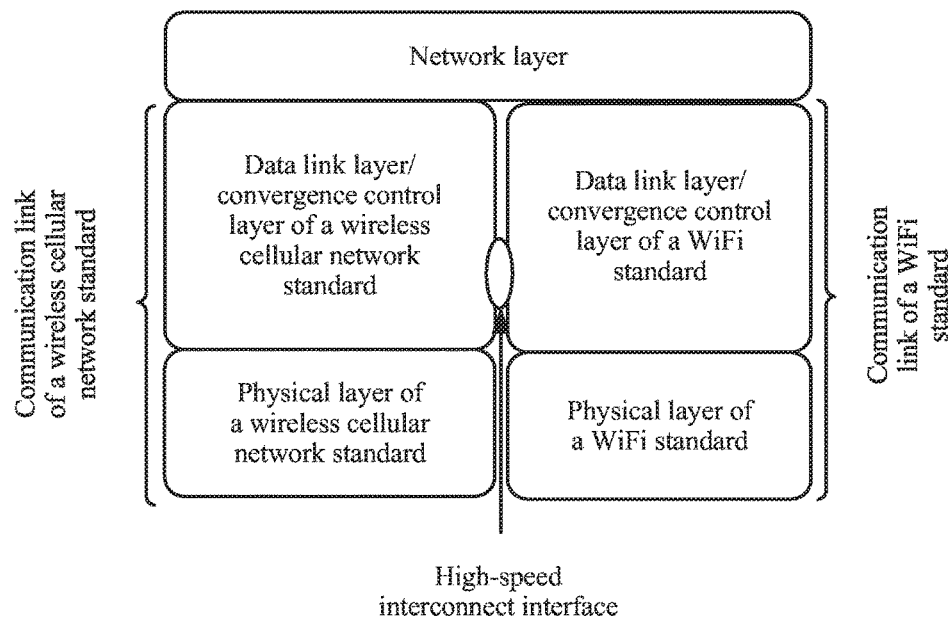
FIG. 3 is a schematic diagram of a combination of a convergence control layer and a data link layer of each communications standard according to an embodiment.

FIG. 3 is a schematic diagram of one implementation manner of a device that has the control functions of multiple standards. A wireless cellular network standard and a WiFi standard are used as examples. A control function of the convergence control layer is distributed at a communication link layer of each communications standard.

The communications standards supported by the data link layers in FIG. 2a, FIG. 2b, FIG. 2c, and FIG. 3 include but are not limited to: a wireless cellular network, a WLAN (particularly WiFi), WiMAX, Bluetooth, and infrared.

Exemplarily, the foregoing physical layer and data link layer may be a hardware module such as a chip or a board. For example, the new data link layer, as shown in FIG. 2b, obtained after data link layers of multiple communications standards are converged, may be a group of software programs that are simultaneously run on one communications board (usually a multi-core processor architecture). Some programs in the program group correspond to exclusive data link layer functions of a first communications standard, some programs correspond to exclusive data link layer functions of a second communications standard, and some programs correspond to public data link layer functions of the first communications standard and the second communications standard. The first communications standard and the second communications standard are different communications standards in multiple communications standards. A Long Term Evolution (LTE) time division duplex (TDD) communications standard and the WLAN communications standard are used as examples. Approximately 30% of the data link layer functions of the two communications standards may be publicly used, for example, a rate adaptation function, a packet assembly and disassembly function, and an out-of-order reordering function. It should be noted that those public data link layer functions use different system parameters to process data of different communications standards. The new data link layer after convergence may be a sum of the data link layers of different communications standards, and may be considered as a larger and more macroscopic data link layer. The new data link layer after convergence eliminates duplicate functions of the different communications standards, and encapsulates a uniform external interface above these data link layers. For a higher layer or a lower layer, only the new data link layer with the uniform interface is visible, and a corresponding data link layer of a specific communications standard is not distinguished any more.

The convergence control layer may be an independent control network element or software. Specifically, the convergence control layer may be a group of software programs that simultaneously run on one communications board (usually a multi-core processor architecture).

For the example shown in FIG. 3 in which the convergence control layer is combined with the data link layer of each communications standard, software programs corresponding to all communications standards may simultaneously run on one communications board (usually a multi-core processor architecture) to implement functions of the data link layers of respective communications standards and functions of the convergence control layers of respective communications standards.

The network layer may be the Transmission Control Protocol/Internet Protocol (TCP/IP) that runs on a central processing unit (CPU).

More specifically, the data link layer of the wireless cellular network communications standard may include a paging channel (CH), a broadcast channel (BCH), a random access channel (RACH), a downlink shared channel (DL-SCH), and an uplink shared channel (USCH).

The physical layer of the wireless cellular network communications standard may include a physical broadcast channel (PBCH), a physical random access channel (PRACH), a physical downlink shared channel (PDSCH), and a physical uplink shared channel (PUSCH).

The data link layer of the WiFi communications standard may include a carrier sense multiple access with collision avoidance (CSMA/CA) module.

The physical layer of the WiFi communications standard may include a shared radio channel.

The uniform data link layer shown in FIG. 2b may specifically include the paging channel, the broadcast channel, the random access channel, the downlink shared channel, the uplink shared channel, and the CSMA/CA module.

Certainly, the paging channel, the broadcast channel, the random access channel, the downlink shared channel, and the uplink shared channel of the uniform data link layer and the physical layer of the wireless cellular network communications standard may still be considered as constituting a wireless cellular communication link.

The CSMA/CA module and the like of the uniform data link layer, and the physical layer of the WLAN communications standard may still be considered as constituting a WLAN communication link.

Collaborative operation between the data link layers of different communications standards may be scheduled by the convergence control layer. Alternatively, in a scenario in which the convergence control layer is combined with the data link layer of each communications standard, direct communication may be performed between the data link layers of different communications standards to implement the collaborative operation.

Figure 4A:
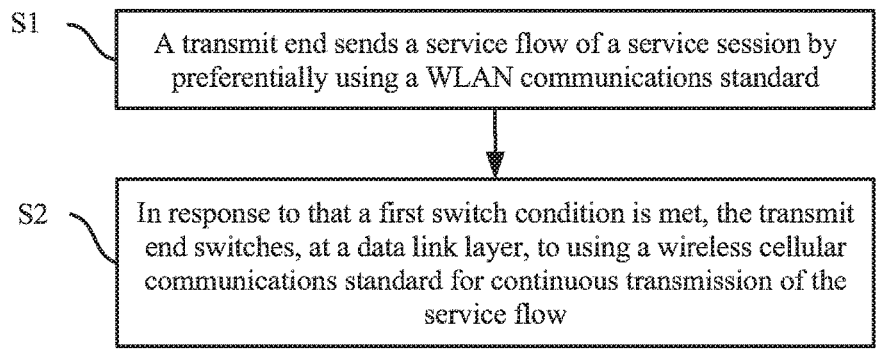
FIG. 4a is a flowchart of a multiple-communications-standard transmission method according to an embodiment.

From another perspective, referring to FIG. 4a, the multiple-communications-standard transmission method executed by the transmit end that has a control functions of multiple standards according to this embodiment may include at least the following steps.

S1. When both a WLAN communications standard and a wireless cellular communications standard are available, a transmit end supporting multiple communications standards sends, by preferentially using the WLAN communications standard, a service flow of a service session to a receive end supporting multiple communications standards.

It should be noted that in a specific application, the WLAN communications standard may be replaced with a communications standard such as Bluetooth or infrared. For example, when both the Bluetooth communications standard and a wireless cellular communications standard are available, a service flow of a service session is sent by preferentially using the Bluetooth communications standard.

Alternatively, an extension may be that when the communications standards such as WLAN, Bluetooth, infrared, and wireless cellular are available, the service flow of the service session is sent by preferentially using the WLAN (or Bluetooth or infrared) communications standard.

S2. In response to that a first switch condition is met, the transmit end switches, at a data link layer, to using the wireless cellular communications standard for continuous transmission of the service flow.

The first switch condition may include at least that a WLAN communication link fails in communication.

Further, the reason for failing in communication may include that a shared radio channel is busy.

It can be learned that, in this embodiment, a service flow is transmitted by preferentially using a WLAN communications standard. When the WLAN communication link fails in communication, the service flow is continuously transmitted by using a wireless cellular communications standard. Using the reliable and stable wireless cellular communications standard to complement deficiency of the WLAN communications standard may effectively overcome a problem that a WLAN technology itself results in an unstable transmission rate because a shared radio channel is busy, and the like.

In addition, in this embodiment, switching of the communications standard is performed at a data link layer below an IP layer, and therefore, does not change or does not need to change an IP address and an IP routing path, thereby avoiding a phenomenon that the service flow is interrupted because of the changes of the IP address and the IP routing path. Actually, when a user enjoys a communication service by using this solution (for example, watching a network video), the user does not know at all that the underlying communications standard has been switched and changed. This solution is transparent to the user.

In addition, a scheduling switch point of the communications standard borne by the service flow is located below an IP layer of an access network (RAN), but not located at a GGSN/PGW of a core network (CN) or a WFC. Therefore, in this embodiment, a communications standard borne by the service flow may be dynamically selected in real time.

In another embodiment, in a scenario in which MAC layers of all communications standards at the transmit end are independent of each other, "the switching to using the wireless cellular communications standard for continuous transmission of the service flow" in all the foregoing embodiments may specifically include: switching, by the transmit end, the service flow from the data link layer of the WLAN communication link to the data link layer of the wireless cellular communication link, so that the service flow is continuously transmitted by the wireless cellular communication link.

However, when the MAC layers of all communications standards at the transmit end are converged into a uniform new MAC layer (as shown in FIG. 2b), the communications standard is switched at the new MAC layer.

Figure 4B:
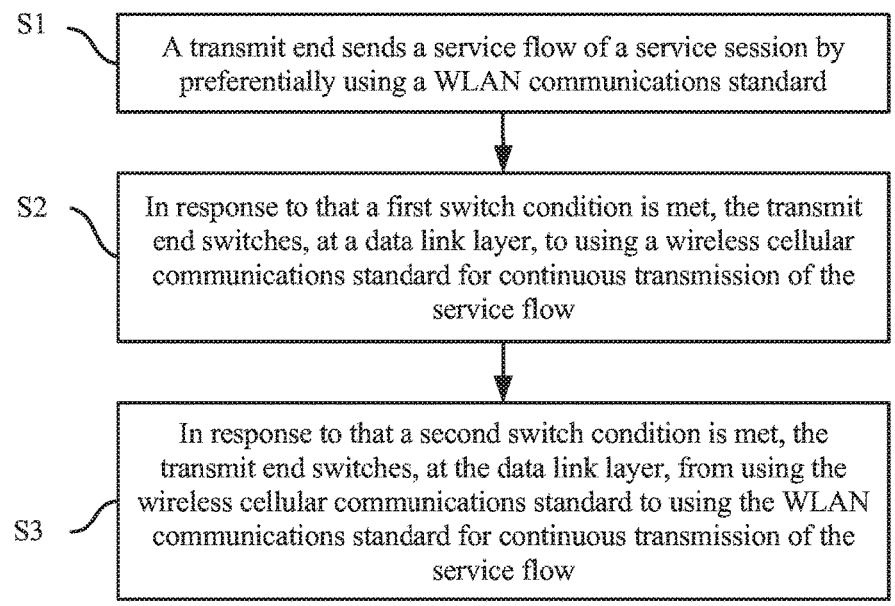
FIG. 4b is another flowchart of a multiple-communications-standard transmission method according to an embodiment.

In another embodiment, referring to FIG. 4b, the foregoing multiple-communications-standard transmission method may further include the following step.

S3. In response to that a second switch condition is met, the transmit end switches, at a data link layer, from using the wireless cellular communications standard to using the WLAN communications standard for continuous transmission of the service flow.

The second switch condition may include at least that the WLAN communication link recovers from a communication failed state to a transmission available state.

It can be learned that, in this embodiment, a service flow is transmitted by preferentially using a WLAN communications standard. When the WLAN communication link fails in communication, the service flow is continuously transmitted by using a wireless cellular communications standard. When the WLAN communication link recovers to a transmission available state, the service flow is continuously transmitted by using the WLAN communications standard.

In another embodiment, in a scenario in which MAC layers of all communications standards at the transmit end are independent of each other, "the switching from using the wireless cellular communications standard to using the WLAN communications standard for continuous transmission of the service flow" in all the foregoing embodiments may specifically include: switching the service flow from the data link layer of the wireless cellular communication link to the data link layer of the WLAN communication link, so that the service flow is continuously transmitted by the WLAN communication link.

However, when the MAC layers of all communications standards at the transmit end are converged into a uniform new MAC layer (as shown in FIG. 2b), the communications standard is switched at the new MAC layer.

Figure 5:
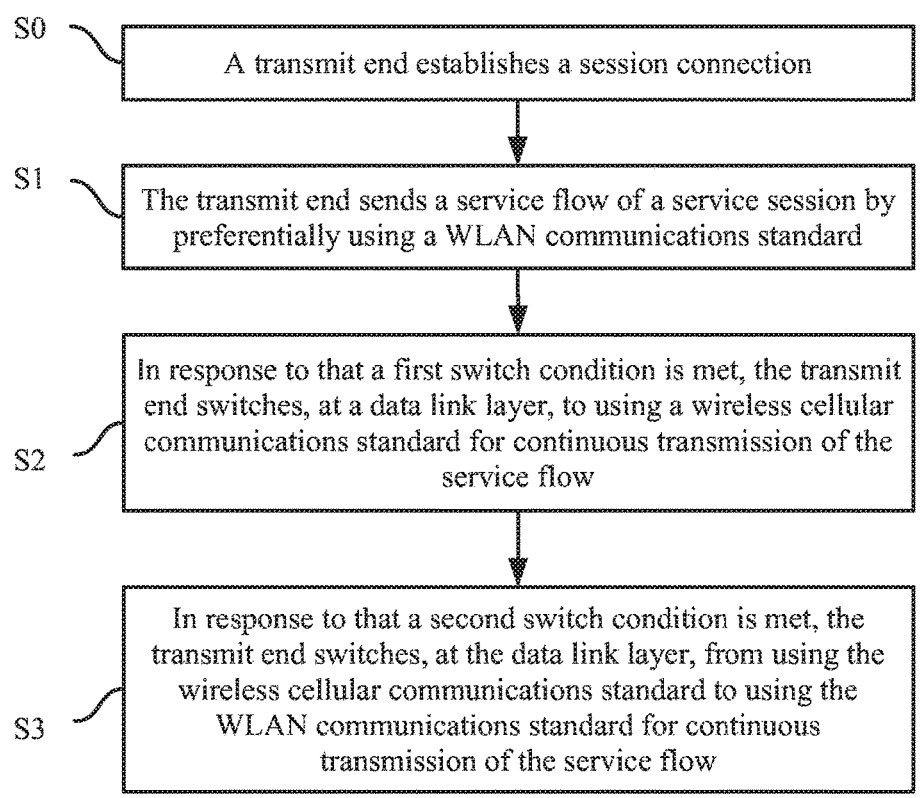
FIG. 5 is still another flowchart of a multiple-communications-standard transmission method according to an embodiment.

In another embodiment, referring to FIG. 5, before the transmit end sends the service flow of the service session to the receive end by preferentially using the WLAN communication link (before step S1), the foregoing embodiment may further include the following step.

S0. The transmit end establishes a session connection (to the receive end).

Establishing the session connection may include multiple details. For example, establishing the session connection may specifically include: respectively creating, by the transmit end, traffic IDs and contexts of the service flow at the data link layer of the WLAN communication link and the data link layer of the wireless cellular communication link.

It should be noted that the service flow may refer to an application layer service flow between a user terminal and a service server. The application layer service flow usually encapsulates data by using the TCP/user data protocol (UDP)/real-time transport protocol (RTP) transport layer protocol and the IP routing layer protocol. Regardless of either a cellular link or a WLAN link used by a radio access network (RAN), service flow data from/to a service server is in a form of an IP packet when arriving at a GGSN/PGW or a WFC.

To bear these IP packets, a Traffic ID and a context need to be created. A specific service flow to which the transmitted data between the data link layer and the higher layer protocol stack or the network layer belongs needs to be identified by using the Traffic ID and the context. How the transmitted service flow between the MAC layer and the higher layer protocol stack or the network layer is identified by using the Traffic ID and the context may use an existing manner. Details are not described herein.

If the Traffic ID and the context of the service flow may be created by the uniform convergence control layer, the Traffic IDs and the contexts, corresponding to the same service flow, of the WLAN communication link and the wireless cellular communication link are the same. However, if the Traffic ID and the context of the service flow are created by the respective MAC layers of the WLAN communication link and the wireless cellular communication link, the Traffic IDs and the contexts of the same service flow are generally different.

Correspondingly, traffic identifiers and contexts of the foregoing service flow also need to be respectively created at the data link layer of the WLAN communication link and the data link layer of the wireless cellular communication link on the side of the receive end.

However, when the MAC layers of all communications standards at the transmit end are converged into the uniform new MAC layer (as shown in FIG. 2b), a traffic ID and a context corresponding to the service flow are created at the new MAC layer, and do not need to be respectively created.

In another embodiment, the process of establishing the session connection may further include the following step.

The transmit end pre-applies for a physical layer transmission resource for the wireless cellular communications link.

More specifically, in the scenario in which the MAC layers of all communications standards at the transmit end are independent of each other, the operation of pre-applying for the physical layer transmission resource may be executed by the MAC layer or a higher layer above the MAC layer of the wireless cellular communication link.

However, in a scenario in which the MAC layer is a converged and uniform new MAC layer, the operation of pre-applying for the physical layer transmission resource may also be executed by the uniform new MAC layer or a higher layer above the MAC layer. For example, the operation of pre-applying for the physical layer transmission resource may be executed by the uniform convergence control layer or the IP layer or the higher layer protocol stack.

After the pre-application succeeds, if the pre-applying operation is executed by the higher layer above the MAC layer, the higher layer notifies the MAC layer (the MAC layer of the wireless cellular communication link or the new MAC layer) of the applied resource.

In addition, if the pre-application succeeds, the transmit end further needs to notify the receive end of the applied physical layer transmission resource.

The purpose for pre-applying for the resource is to increase a speed of the switch between multiple standards. In this embodiment, regardless of whether the wireless cellular standard is currently used to transmit data, pre-application for a wireless transmission resource (mainly the physical layer transmission resource) is performed for the service flow. In this way, when the WLAN communications standard is switched to the cellular communications standard, the data may be transmitted by directly using the applied physical layer transmission resource, instead of applying for the transmission resource only after the switch to the cellular communications standard. Therefore, a response speed of the switch between multiple standards can be greatly increased.

Correspondingly, in the scenario in which the MAC layers of all communications standards at the transmit end are independent of each other, "the service flow is continuously transmitted by the wireless cellular communication link" in all the foregoing embodiments may further be detailed as follows.

The data link layer of the wireless cellular communication link invokes the physical layer of this communication link, and continuously transmits the service flow on the pre-applied transmission resource.

Alternatively, in the scenario in which the MAC layer is the converged and uniform new MAC layer, "the service flow is continuously transmitted by the wireless cellular communication link" in all the foregoing embodiments may further be detailed as follows.

The converged and uniform MAC layer invokes the physical layer of the wireless cellular communications standard, and continuously transmits the service flow on the pre-applied transmission resource.

To make persons skilled in the art more clearly understand the technical solutions provided in the embodiments, the following of this specification uses an example in which the wireless network access point serves as a transmit end (the transmit end includes independent MAC layers of multiple communications standards, and the multiple communications standards include WiFi and wireless cellular), and describes, by using a more specific embodiment, the multiple-communications-standard transmission method provided in the embodiments.

Figure 6:
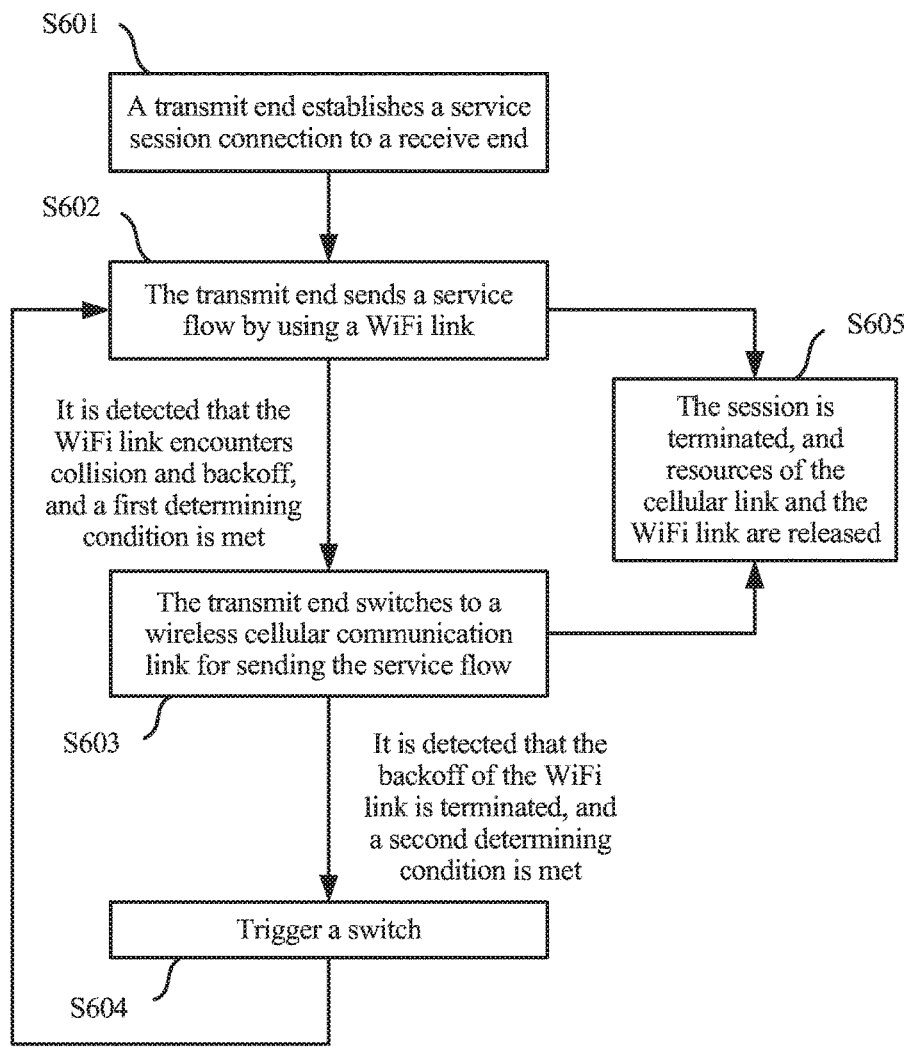
FIG. 6 is still another flowchart of a multiple-communications-standard transmission method according to an embodiment.

Referring to FIG. 6, the multiple-communications-standard transmission method may include the following steps.

Step 601: A transmit end establishes a service session connection to a receive end.

Specifically, the transmit end and the receive end respectively create Traffic IDs and contexts at MAC layers of a wireless cellular communication link and a WiFi communication link. In addition, the transmit end further pre-applies for a physical layer transmission resource for the wireless cellular communication link.

For a related introduction, refer to the foregoing records in this specification. Details are not described herein again.

Step 602: The transmit end sends service flow data to the receive end by using a WiFi link, and the transmit end monitors in real time whether the WiFi link fails in communication.

As mentioned above, the reason for failing in communication may include that a shared radio channel is busy. In a WiFi communications standard, the reason that a radio channel is busy may include that a shared radio channel encounters CSMA/CA contention and backoff.

In practice, in an independent working process by using WiFi, at a specific moment, there may be multiple WiFi devices that serve as transmit ends and contend for using the shared radio channel. Wireless signals sent by the multiple WiFi devices overlap on the shared radio channel. From a perspective of a receiving device, the receiving device receives cluttered wireless signals, and therefore, cannot accurately decode received information. This situation is also referred to as a case in which the wireless signals encounter CSMA contention. In this case, the receive end does not feed back an ACK (acknowledgement frame) to the transmit end.

However, after detecting the CSMA contention, the transmit end chooses to perform backoff. Alternatively, it may be considered that the first switch condition specifically includes that the shared radio channel encounters CSMA contention and backoff.

After detecting that the backoff is terminated, the transmit end may continually use the shared radio channel.

The CSMA/CA refers to a carrier sense multiple access with collision avoidance protocol—defined in the IEEE 802.11 protocol, followed by a WiFi network interface card. The transmit end may learn, by monitoring a CSMA/CA register of the WiFi network interface card, whether the WiFi link is currently available for transmitting data, or a waiting time required for transmitting data.

In this embodiment, that the transmit end monitors in real time whether the WiFi link fails in communication may specifically include: the transmit end monitors in real time whether the WiFi link encounters CSMA contention, or whether the backoff is terminated.

Further, a CSMA/CA module of the WiFi link on the side of the transmit end may monitor whether this link encounters the CSMA contention or whether the backoff is terminated, and report to a controller of the WiFi link in real time.

If the transmit end includes a uniform convergence control layer, the controller of the WiFi link reports, to the uniform convergence control layer, whether the WiFi link encounters the contention and the backoff. The uniform convergence control layer determines whether a switch (that is, subsequent steps 603 and 604) needs to be triggered.

Step 603: When detecting that the WiFi link encounters contention and backoff (corresponding to a first switch condition), and that a first determining condition is also met, the transmit end triggers the switch, and sends the service flow data to the receive end by using a wireless cellular communication link.

That is, in this embodiment, the switch from a WiFi standard to a cellular standard is not triggered immediately after it is detected that the WiFi link encounters CSMA/CA contention and backoff, but the switch is triggered only after the first determining condition is also met.

The foregoing first determining condition includes but is not limited to.

Condition 1: In an observation window of specified duration, a quantity of times that the WiFi link encounters contention reaches a threshold N, where N≥1.

Persons skilled in the art may set the duration and the threshold N according to a practical requirement and experience. For example, the duration may be 0.5 s or 1 s, and N may be 2, 3, 4, or 5.

Condition 2: A waiting time of to-be-sent data in a buffer queue of the transmit end reaches a threshold D, where D≥N×T. T indicates an average waiting time of waiting for termination of the backoff.

A specific value of T may be set flexibly, for example, may be set to 100 ms.

Condition 3: The cellular link has sufficient and available transmission resource currently.

The foregoing first determining condition and the first switch condition must be both met to trigger the switch from the WiFi standard (link) to the cellular standard (link).

Alternatively, it may be considered that the first switch condition further includes the first determining condition.

Step 604: When the transmit end performs data transmission by using the cellular link, if the transmit end detects that the backoff of the WiFi link is terminated (corresponding to the second switch condition), and that a second determining condition is also met, the transmit end triggers the switch from the cellular link back to the WiFi link, and turns to step 602.

As mentioned previously, the second switch condition may include that the WLAN communication link recovers from the communication failed state to the transmission available state. The reason for failing in communication may further include that the radio channel is busy. Further, the reason that the radio channel of the WiFi link is busy includes that the radio channel encounters contention and backoff. Therefore, the second switch condition may also be considered as including that the backoff of the WiFi communication link is terminated.

The foregoing second determining condition includes but is not limited to.

Condition 4: In an observation window of specified duration, the WiFi link maintains the transmission available state.

Persons skilled in the art may set the duration according to a practical requirement and experience. For example, the duration may be 0.5 s or 1 s.

Condition 5: New data in the data buffer queue of the transmit end waits for being sent (if no new data in the buffer queue needs to be sent, retransmission is not required, and therefore there is no need to perform a switch).

The foregoing conditions 4 and 5, and that the WiFi communication link recovers from the communication failed state to the transmission available state must be all met to trigger the switch from the cellular standard (link) to the WiFi standard (link).

Optionally, the foregoing second determining condition may further include a condition 6 that the wireless cellular link that is sending data has confirmed the ACK feedback.

Alternatively, it may be considered that the second switch condition further includes the second determining condition.

Step 605: The session is terminated, and resources of the cellular link and the WiFi link are released.

In practice, an upper layer notifies that the session is terminated. After receiving the notification, MAC layers of the cellular link and the WiFi link release resources.

It should be noted that, as mentioned previously, in the case of communication by using WiFi in the prior art, if the transmit end detects CSMA contention, the transmit end chooses to perform backoff, and uses the shared radio channel only after the backoff is terminated. Therefore, when the WiFi is used for communication, user equipment inevitably needs to wait for the termination of the backoff, and does not transmit a service flow within a waiting period (or referred to as a backoff time). After each contention occurs, backoff duration is of a magnitude of several milliseconds to tens of milliseconds.

However, an existing switch mechanism is to switch the communications standard at an IP layer. An ultimate response time of the switch mechanism is at least 200 milliseconds and at most 1000 milliseconds, which is much greater than the magnitude of several milliseconds to tens of milliseconds. This is because the TCP/IP protocol switches the standard based on an RTT (Round-Trip Time), and a measurement period of the RTT is of a second level.

Because the response time of the existing switch mechanism is much greater than the backoff duration of the WiFi technology, using the existing switch mechanism cannot quickly switch in real time the standard when the WiFi link encounters contention and backoff.

However, in this embodiment on, the switch of the communications standard is performed at the MAC layer below the IP layer. This may implement rapid switch of the communications standard. According to the solutions provided in the present embodiments, within the period of waiting for the termination of the backoff of the WiFi link, the service flow may be transmitted by switching to the wireless cellular standard at a high speed. After the backoff is terminated, the service flow may further be transmitted by switching back to the WiFi standard at a high speed. Therefore, the waiting time may be used to improve throughput of user data.

In another embodiment, before the session connection is established, all the foregoing embodiments may further include the following step.

The transmit end communicates with the receive end to determine whether both parties support multiple communications standards.

A switch between multiple communications standards can be implemented only when both parties support the multiple communications standards. Therefore, if one party supports only one communications standard, the switch between communications standards cannot be performed.

The foregoing step that the transmit end supporting the multiple communications standards sends, by preferentially using the WLAN communications standard, the service flow of the service session to the receive end supporting the multiple communications standards is executed after it is determined that both parties support the multiple communications standards.

More specifically, the transmit end supporting the multiple communications standards may send an inquiry message to the receive end to inquiry whether the receive end supports the multiple communications standards. The inquiry message may further carry the multiple communications standards supported by the transmit end, so that the receive end learns the specific communications standards supported by the transmit end.

The receive end replies with an answer message to indicate whether the multiple communications standards are supported. Likewise, the answer message may further carry the multiple communications standards supported by the receive end.

In another embodiment, after it is determined that both parties support the multiple communications standards, and before the session connection is established, all the foregoing embodiments may further include the following step.

The transmit end allocates storage space to the service flow from a multiple-communications-standard shared storage area, and sets a public flag bit for the service flow.

Both of the foregoing shared storage area and the public flag bit can be accessed by the data link layer of each communications standard or the uniform data link layer at the transmit end (the access includes read and write operations).

To-be-sent data (block), of the service flow, that is processed by a higher layer is placed in the foregoing storage space (which logically forms the buffer queue mentioned previously). It should be noted that a higher layer of the WiFi communications standard is specifically an IP layer, and a higher layer of an LTE communications standard is a higher layer protocol stack.

The shared storage area may be set between the MAC layers, or set on any device that can be accessed by a MAC layer.

The public flag bit may be stored in a register.

The public flag bit may include at least a transmission flag bit. A first value of the transmission flag bit may be used to identify that transmission of the service flow is completed, and a second value of the transmission flag bit may be used to identify that the transmission of the service flow is not completed. The first value is unequal to the second value. Typically, the first value may be specifically 1, and the second value may be specifically 0; or the first value may be specifically 0, and the second value may be specifically 1.

An initial value of the transmission flag bit is the second value. After it is determined that the transmission of the foregoing service flow is completed, the transmit end sets the transmission flag bit to the second value.

Correspondingly, in another embodiment, all the foregoing embodiments may further include the following step.

The transmit end deletes, in response to an ACK feedback, the corresponding to-be-sent data from the foregoing storage space.

When different communication links perform transmission, link performance of the different communication links is different. To ensure that transmission quality is consistent as much as possible before and after the link switch, in another embodiment, before the wireless cellular communication link performs continuous transmission, all the foregoing embodiments may further include the following step.

The transmit end performs matched mapping between a link performance parameter of the WLAN communication link and a link performance parameter of the wireless cellular communication link.

More specifically, the foregoing link performance parameter may be an "expected transmission rate." That is, the transmit end may perform matched mapping between the expected transmission rate of the WLAN communications link and the expected transmission rate of the wireless cellular communications standard.

After the matched mapping, the MAC layers of different communications standards or the uniform new MAC layer decomposes the expected transmission rate after completion of the matched mapping into a coding manner, a modulation manner, a multiple-antenna manner, a time-frequency resource manner, and the like that may be understood by the physical layer.

Correspondingly, the foregoing "that the service flow is continuously transmitted on the pre-applied transmission resource" may further include.

The data link layer of the wireless cellular communication link (or the uniform new data link layer) allocates, according to a link performance parameter mapping relationship, some or all of the pre-applied transmission resources to continuously transmit the foregoing service flow; and the physical layer of the wireless cellular communications standard continuously transmits the foregoing service flow on the allocated transmission resource.

The link performance parameter mapping relationship may be used as a part of the public flag bit, and stored in the register.

Figure 7:
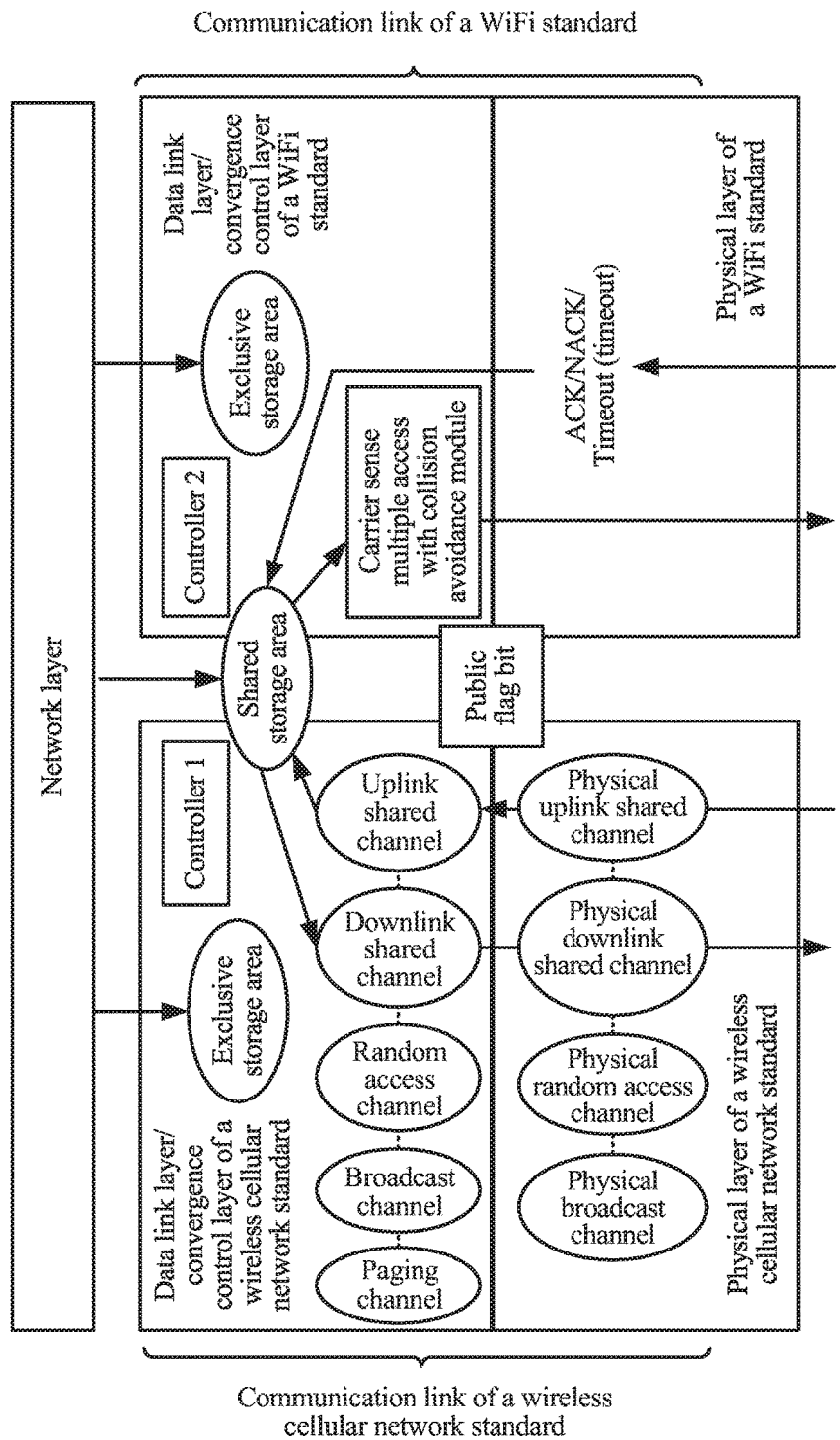
FIG. 7 is a schematic structural diagram of a transmit end according to an embodiment.

To enable persons skilled in the art more clearly understand the technical solutions provided in the embodiments, the following uses a transmit end shown in FIG. 7 as an example, and describes, by using a more specific embodiment, the multiple-communications-standard transmission method provided in the embodiments.

A control function of a convergence control layer of a transmit end shown in FIG. 7 is distributed in a communication link layer of each communications standard.

A MAC layer of a wireless cellular link includes a controller 1, an exclusive storage area, a paging channel, a broadcast channel, a random access channel, a downlink shared channel, and an uplink shared channel.

A physical layer of the wireless cellular link includes a physical broadcast channel, a physical random access channel, a physical downlink shared channel, and a physical uplink shared channel.

A MAC layer of a WiFi link includes a controller 2, an exclusive storage area, and a CSMA/CA module.

Based on the transmit end shown in FIG. 7, an exemplary process of the multiple-communications-standard transmission method is shown as follows.

Step 1: Before a service session is established, a transmit end and a receive end perform capability negotiation (communication) to determine whether respective device hardware supports multiple communications standards.

Further, a higher layer above a MAC layer and the receive end may perform the capability negotiation.

Step 2: If a capability negotiation result is that the respective device hardware supports multiple communications standards, a controller 1 included in a MAC layer of a cellular link of the transmit end and a controller 2 included in a MAC layer of a WiFi link of the transmit end are simultaneously activated.

The MAC layer of the WiFi link may allocate a storage space to a service flow from a shared storage area, and designate a register for storing a public flag bit.

Alternatively, in another embodiment, the higher layer above the MAC layer may allocate the storage space, and designate the register for storing the public flag bit.

In addition, the controller 1 and the controller 2 respectively create Traffic IDs and contexts. The controller 1 further pre-applies for a physical layer transmission resource from a radio resource manager (RRM) of the cellular link.

Alternatively, the Traffic ID and the context of the wireless cellular link may also be created by an RRC layer.

However, if the capability negotiation result is that the respective device hardware does not support multiple communications standards, the transmit end transmits data according to a conventional method: placing to-be-sent data of the service flow in the exclusive storage area of the MAC layer of the cellular link or the exclusive storage area of the MAC layer of the WiFi link. A subsequent processing procedure is the same as that in the prior art, and details are not described herein.

Step 3: To-be-sent data enters storage space of a shared storage area by using an IP layer.

Step 4: According to the negotiation (communication) between the controller 1 and the controller 2, determine that the WiFi link is currently used to transmit the data.

The controller 1 and the controller 2 may directly negotiate by using a high-speed interconnect interface.

Step 5: A CSMA/CA module of the MAC layer of the WiFi link monitors whether the WiFi link is in a transmission available state.

Step 6: When the CSMA/CA module senses that the WiFi link is in a transmission available state, a physical (PHY) layer of the WiFi link obtains data from the shared storage area, and sends the data to a radio channel.

Step 7: The PHY layer of the WiFi link awaits an ACK/negative acknowledgement (NACK) feedback signal.

If the WiFi-PHY layer receives the ACK, the WiFi-MAC layer deletes the corresponding data from the shared storage area; if the WiFi-PHY layer receives the NACK/NULL, the WiFi-MAC layer reserves the corresponding data.

It should be noted that, in the prior art, a WiFi link feeds back only the ACK, and does not feed back the NACK/NULL. When not receiving the ACK upon expiry of the waiting time, the WiFi link considers that the sending fails, and then resends the data. However, a possibility that the NACK/NULL feedback will be introduced into the WiFi mechanism in future is not excluded.

Except that the time is out or the NACK/NULL is received, the WiFi link may further learn, according to the monitoring of the CSMA/CA module, whether the data sent last time encounters contention and backoff. If the CSMA/

CA module detects that contention and backoff occur, the WiFi link learns that the sending fails, and then resends the data that fails in sending.

Step 8: The CSMA/CA module of the WiFi link detects that a WiFi channel encounters contention and backoff, and reports information about the contention and backoff to the controller 2.

Step 9: According to the negotiation (communication) between the controller 2 and the controller 1, determine that the cellular link is currently used to continuously transmit the data.

Step 10: The controller 1 and the controller 2 exchange contexts, and complete matched mapping between performance parameters of the cellular link and the WiFi link to obtain a link performance parameter mapping relationship. Then according to the link performance parameter mapping relationship, the controller 1 allocates some or all of the pre-applied transmission resources to be used for continuous transmission.

Certainly, if it is found that the pre-applied transmission resource is insufficient in a transmission process, a transmission resource may be pre-applied for again.

For detailed content, refer to the foregoing records in this specification. Details are not described herein again.

Before the cellular link performs the continuous transmission, the MAC layer (the controller 2) of the WiFi link needs to transfer an access permission of the storage space to the MAC layer (the controller 1) of the cellular link. The MAC layer of the cellular link accesses the storage space, and obtains the to-be-sent data from the storage space to perform continuous transmission.

In addition, in a process in which the WiFi link is switched to the cellular link for the first time, after it is determined that the cellular link is currently used to continuously transmit the data and before the MAC layer of the cellular link accesses the storage space, the controller 1 and the controller 2 further need to exchange an expected transmission rate (the link performance parameter), and the controller 1 performs matched mapping. After the matched mapping is completed, the link performance parameter mapping relationship is stored in the public flag bit.

In this way, when a switch is performed next time, the link performance parameter mapping relationship stored in the public flag bit may be directly applied, thereby saving time.

Step 11: The controller 1 obtains data from the shared storage area, and sends the data to the radio channel by successively using a DL-SCH transmission channel and a PDSCH transmission channel.

Step 12: The controller 1 awaits the ACK/NACK feedback on a PUSCH transmission channel and a UL-SCH transmission channel.

If receiving the ACK, the controller 1 deletes the corresponding data from the shared storage area; if receiving the NACK/NULL, the controller 1 reserves the corresponding data.

Step 13: When the controller 2 of the WiFi link detects that the WiFi link terminates the backoff and does not encounter contention any more, trigger the switch, and go to step 6. Circularly perform the steps until the service session is terminated, and then go to step 14.

Step 14: An upper lever of the transmit end notifies the controller 1 of the cellular link and the controller 2 of the WiFi link of "that the service session is terminated". The controller 1 and the controller 2 respectively release the wireless resources, the shared storage areas, and the public flag bits of the cellular link and the WiFi link.

It should be noted that if the transmit end includes a uniform convergence control layer, the convergence control layer may be responsible for negotiating with convergence control layer of the receive end (about whether the receive end supports multiple communications standards), determining to communicate by using a specific communications standard, determining and notifying the MAC layer of switching the communications standard, performing matched mapping between link performance parameters, and the like.

In addition, the uniform convergence control layer may further participate in the service flow transmission. For example, the uniform convergence control layer may transparently transmit an IP packet to a MAC layer of a specific standard (in this case, the shared storage area may be considered as being at the convergence control layer). Except the transparent transmission, a possibility that the convergence control layer encapsulates and processes the IP packet in future is not excluded.

Certainly, the uniform convergence control layer may not participate in the service flow transmission. The IP layer (or a higher layer) directly places the to-be-sent data of the service flow in the shared storage area.

However, if the function of the convergence control layer is converged into the MAC layer of each communications standard, the MAC layers communicate with each other to: negotiate to communicate by using a specific communications standard, switch the communications standard, perform matched mapping between link performance parameters.

It should be further noted that, as mentioned above, the transmit end may refer to UE, or may refer to a wireless network access point (for example, a base station).

When the UE serves as the transmit end, the UE may complete the operations, performed by the transmit end, in all the foregoing embodiments, for example, actively determining to communicate by using a specific communications standard, switching the communications standard, pre-applying for the physical layer transmission resource, and the like.

In addition, to reduce complexity on the UE side, the base station side may determine to communicate by using a specific communications standard, switch the communications standard, pre-apply for the physical layer transmission resource, and the like.

The determining to communicate by using a specific communications standard is used as an example. After the session connection is established, the base station determines and indicates that the UE communicates by using the WiFi communications standard. The UE complies with the indication from the base station, and sends the service flow by using the WiFi communications standard.

The switching the communications standard is used as an example. The UE serving as the transmit end may monitor the WiFi link. When the WiFi link encounters contention, the UE reports information about the contention and backoff to the base station. The base station determines to switch the communications standard (for example, switch to using the cellular link for continuous transmission of the data), and notifies the UE. Then the UE switches the communications standard at the MAC layer.

When detecting that the WiFi link terminates the backoff and does not encounter contention any more, the UE also reports to the base station. The base station determines to switch the communications standard (for example, switch to using the WiFi link for continuous transmission of the data), and notifies the UE. Then the UE switches the communications standard at the MAC layer.

The pre-applying for the physical layer transmission resource is used as an example. The UE may send a request to the base station by using an uplink dedicated control channel, to notify the base station of "how much data needs to be sent, and that allocation of the physical layer transmission resource is requested."

After the base station receives the request information, if there is an available resource for the UE to use, the base station feeds back, to the UE by using a downlink dedicated control channel, the physical layer transmission resource that is available for the UE.

If one pre-application of the UE is insufficient for sending all data, the UE may repeat the foregoing processes to pre-apply for a transmission resource again.

Correspondingly, this embodiment intends to protect a multiple-communications-standard transmission apparatus. The multiple-communications-standard transmission apparatus may be used as a wireless network access point or a terminal (for example, a smartphone, a tablet computer, or a portable computer). In addition, a terminal mentioned in each embodiment may also be referred to as a system, a subscriber unit, a subscriber station, a mobile site, a mobile station, a remote station, a remote terminal, a mobile device, a user terminal, a terminal, a wireless communications device, a user agent, a user apparatus, or UE (User Equipment). The terminal may be a cellular phone, a cordless telephone set, a SIP (Session Initiation Protocol) phone, a WLL (Wireless Local Loop) station, a PDA (Personal Digital Assistant), a hand-held device having a wireless communication function, a computing device, or another processing device connected to a wireless modem. The terminal may also be an in-vehicle device or a wearable device.

Figure 8:
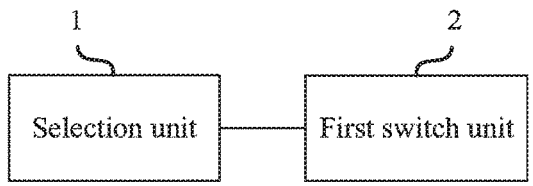
FIG. 8 is an exemplary structural diagram of a multiple-communications-standard transmission apparatus according to an embodiment.

FIG. 8 shows an exemplary structure of the foregoing multiple-communications-standard transmission apparatus. The multiple-communications-standard transmission apparatus may include: a selection unit 1, configured to: when both a WLAN communications standard and a wireless cellular communications standard are available, send, by preferentially using the WLAN communications standard, a service flow of a service session to a receive end supporting multiple communications standards; and a first switch unit 2, configured to: in response to that a first switch condition is met, switch, at a data link layer, to using the wireless cellular communications standard for continuous transmission of the foregoing service flow, where the foregoing first switch condition includes at least that a WLAN communication link fails in communication.

For specific content, refer to the foregoing records in this specification. Details are not described herein again.

Figure 9:
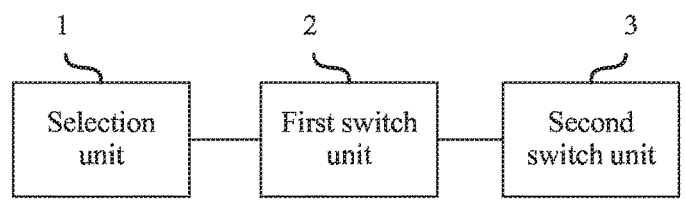
FIG. 9 is another exemplary structural diagram of a multiple-communications-standard transmission apparatus according to an embodiment.

In another embodiment, referring to FIG. 9, the apparatus in all the foregoing embodiments may further include: a second switch unit 3, configured to: in response to that a second switch condition is met, switch, at the data link layer, from using the wireless cellular communications standard to using the WLAN communications standard for continuous transmission of the foregoing service flow.

The foregoing second switch condition includes at least that the WLAN communication link recovers from a communication failed state to a transmission available state.

Figure 10:
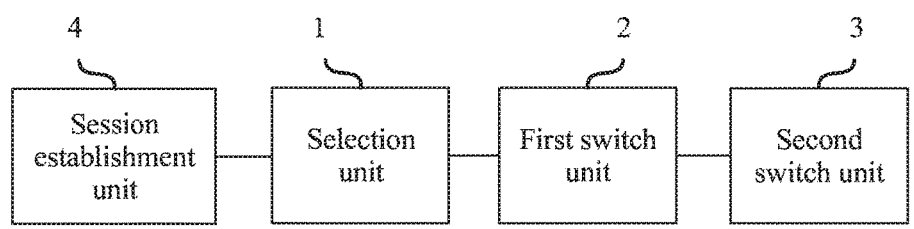
FIG. 10 is still another exemplary structural diagram of a multiple-communications-standard transmission apparatus according to an embodiment.

In another embodiment, referring to FIG. 10, the apparatus in all the foregoing embodiments may further include: a session establishment unit 4, configured to establish a session connection before the selection unit 1 sends, by preferentially using the WLAN communication link, the service flow of the service session to the foregoing receive end.

Establishing the session connection may include multiple details. For example, establishing the session connection may specifically include: respectively creating traffic identifiers and contexts of the foregoing service flow at the data link layer of the WLAN communication link and the data link layer of the wireless cellular communication link.

In addition, establishing the session connection may further include the following operation: pre-applying for a physical layer transmission resource for the wireless cellular communications standard.

For specific content, refer to the foregoing records in this specification. Details are not described herein again.

Figure 11:
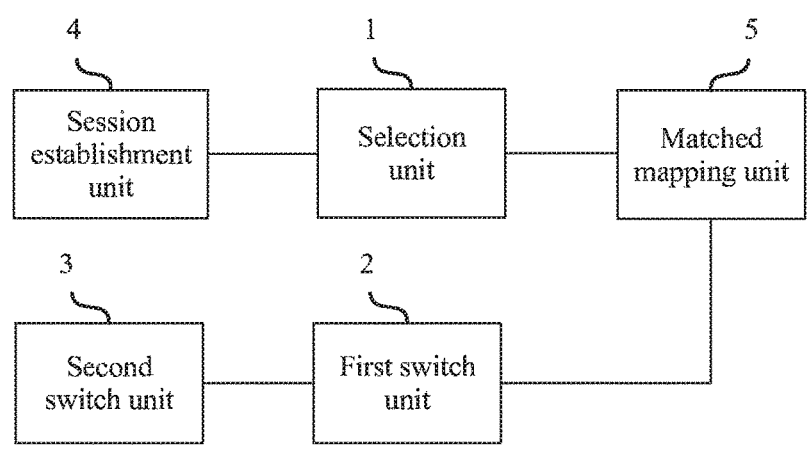
FIG. 11 is still another exemplary structural diagram of a multiple-communications-standard transmission apparatus according to an embodiment.

In another embodiment, referring to FIG. 11, the apparatus in all the foregoing embodiments may further include: a matched mapping unit 5, configured to perform matched mapping between the link performance parameter of the WLAN communications standard and the link performance parameter of the foregoing wireless cellular communications standard before the foregoing wireless cellular communication link performs continuous transmission.

For specific content, refer to the foregoing records in this specification. Details are not described herein again.

Figure 12:
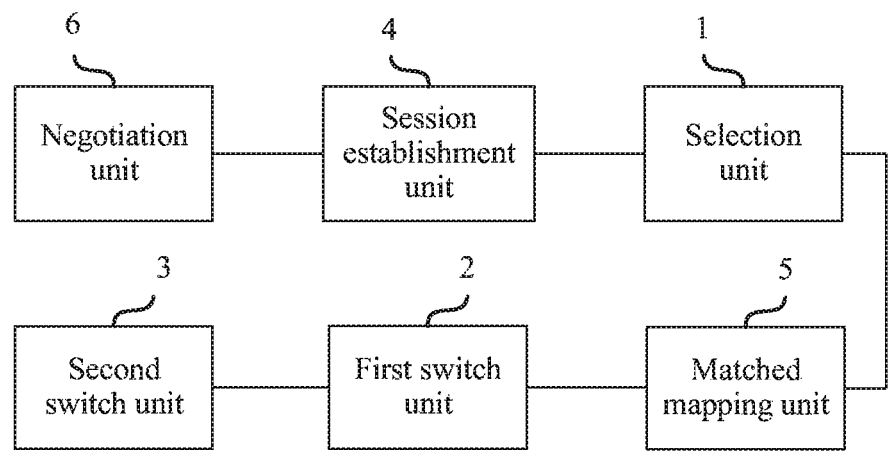
FIG. 12 is still another exemplary structural diagram of a multiple-communications-standard transmission apparatus according to an embodiment.

In another embodiment, referring to FIG. 12, the apparatus in all the foregoing embodiments may further include: a negotiation unit 6, configured to: before the session connection is established, communicate with the receive end to determine whether both parties support multiple communications standards.

The selection unit 1 sends, by preferentially using the WLAN communications standard and after it is determined that both parties support the multiple communications standards, the service flow of the service session to the receive end supporting the multiple communications standards.

More specifically, the negotiation unit 6 may send an inquiry message to the receive end to inquiry whether the receive end supports the multiple communications standards. The inquiry message may further carry the multiple communications standards supported by the transmit end (a multiple-communications-standard transmission apparatus), so that the receive end learns the specific communications standards supported by the transmit end.

The receive end replies with an answer message to indicate whether the multiple communications standards are supported. Likewise, the answer message may further carry the multiple communications standards supported by the receive end. For specific content, refer to the foregoing records in this specification. Details are not described herein again.

Figure 13:
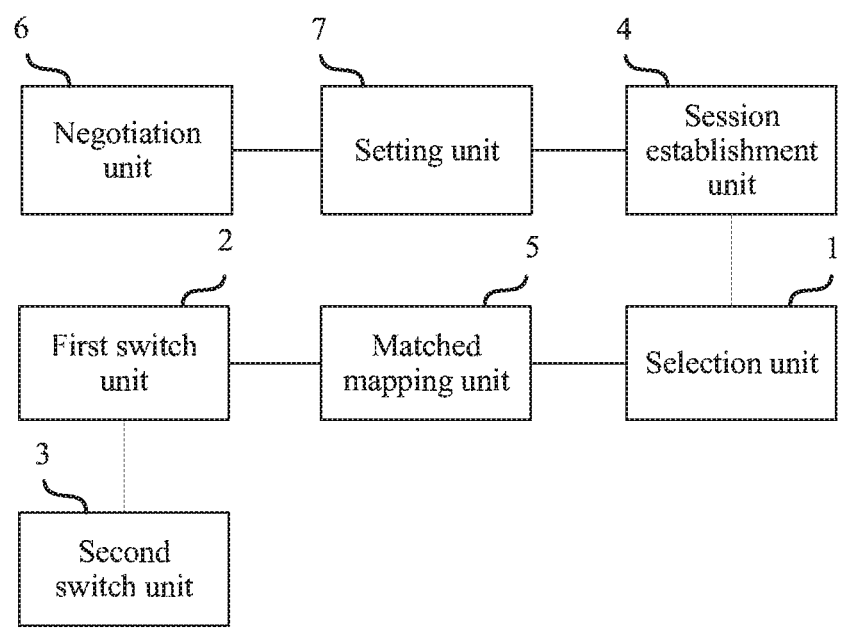
FIG. 13 is still another exemplary structural diagram of a multiple-communications-standard transmission apparatus according to an embodiment.

In another embodiment, referring to FIG. 13, the apparatus in all the foregoing embodiments may further include:

a setting unit 7, configured to: after it is determined that both parties support the multiple communications standards and before the session connection is established, allocate storage space to the foregoing service flow from a multiple-communications-standard shared storage area, and set a public flag bit for the service flow. For specific content, refer to the foregoing records in this specification. Details are not described herein again.

In another embodiment, the apparatus in all the foregoing embodiments may further include: a deletion unit, configured to delete, in response to an ACK feedback, corresponding to-be-sent data from the foregoing storage space.

Figure 14:
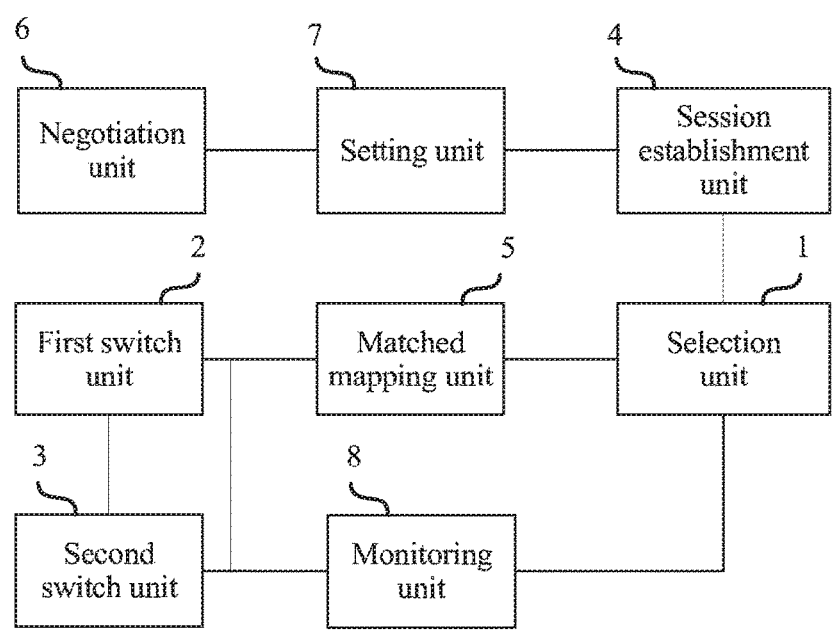
FIG. 14 is still another exemplary structural diagram of a multiple-communications-standard transmission apparatus according to an embodiment.

In another embodiment, referring to FIG. 14, the apparatus in all the foregoing embodiments may further include: a monitoring unit 8, configured to monitor in real time whether the foregoing WLAN communication link fails in communication. For specific content, refer to the foregoing records in this specification. Details are not described herein again.

In the several embodiments provided in the present embodiments, it should be understood that the disclosed apparatus and method may be implemented in other manners. For example, the described apparatus embodiment is merely schematic. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments. The foregoing storage medium includes: any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for illustration. In actual application, the foregoing functions can be allocated to different function modules and implemented according to a requirement: an inner structure of an apparatus is divided into different function modules to implement all or some of the functions described above. For a detailed working process of the foregoing apparatus, reference may be made to a corresponding process in the foregoing method embodiments, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A method comprising:
    sending, by a transmit end to a receive end, a service flow of a service session, in response to both a wireless local area network (WLAN) communications standard and a wireless cellular communications standard being available, wherein the transmit end supports multiple communications standards by preferentially using the WLAN communications standard, and wherein the receive end supports multiple communications standards;
    switching, by the transmit end at a data link layer, to using the wireless cellular communications standard for continuous transmission of the service flow, in response to a first switch condition being met, wherein the first switch condition comprises a WLAN communication link failure;
    establishing, by the transmit end, a session connection, before sending the service flow of the service session;
    before establishing the session connection, communicating, by the transmit end, with the receive end to determine whether both the transmit end and the receive end support multiple communications standards, wherein sending the service flow of the service session is executed after determining that both the transmit end and the receive end support the multiple communications standards; and
    after determining that both the transmit end and the receive end support the multiple communications standards and before establishing the session connection, allocating, by the transmit end, storage space to the service flow from a multiple-communications-standard shared storage area, and setting a public flag bit for the service flow,
    wherein the shared storage area is accessible by the data link layer of the transmit end, and to-be-sent data of the service flow processed by a higher layer is placed in the storage space,
    wherein the public flag bit is accessible by the data link layer of the transmit end, and the public flag bit comprises at least a transmission flag bit, and
    wherein a first value of the transmission flag bit identifies that the service flow is completely transmitted, a second value of the transmission flag bit identifies that the service flow is not completely transmitted, and the first value is not equal to the second value.

2. The method according to claim 1, further comprising switching, by the transmit end at the data link layer, from using the wireless cellular communications standard to using the WLAN communications standard for continuous transmission of the service flow, in response to second switch condition being met, wherein the second switch condition comprises the WLAN communication link recovering from a communication failed state to a transmission available state.

3. The method according to claim 2, wherein switching from using the wireless cellular communications standard to using the WLAN communications standard for continuous transmission of the service flow comprises switching, by the transmit end, the service flow from a data link layer of a wireless cellular communication link to a data link layer of the WLAN communication link, so that the service flow is continuously transmitted by the WLAN communication link.

4. The method according to claim 1, wherein switching to using the wireless cellular communications standard for continuous transmission of the service flow comprises switching, by the transmit end, the service flow from a data link layer of the WLAN communication link to a data link layer of a wireless cellular communication link, so that the service flow is continuously transmitted by the wireless cellular communication link.

5. The method according to claim 1, wherein establishing the session connection comprises:
creating, by the transmit end, traffic identifiers at the data link layer of the WLAN communication link; and
creating contexts of the service flow at the data link layer of a wireless cellular communication link.

6. The method according to claim 5, wherein establishing the session connection further comprises pre-applying, by the transmit end, for a physical layer transmission resource for the wireless cellular communications standard.

7. The method according to claim 1, further comprising deleting, by the transmit end, a corresponding to-be-sent data from the storage space, in response to an ACK feedback.

8. The method according to claim 1, further comprising performing, by the transmit end, matched mapping between a link performance parameter of the WLAN communications standard and a link performance parameter of the wireless cellular communications standard, before a wireless cellular communication link performs continuous transmission.

9. The method according to claim 1, further comprising monitoring, by the transmit end in real time, whether the WLAN communication link fails in communication.

10. A transmission apparatus comprising:
a processor; and
a non-transitory computer readable storage medium storing a program for execution by the processor, the program including instructions to:
send, to a receive end, by preferentially using a wireless local area network (WLAN) communications standard, a service flow of a service session, in response to both the WLAN communications standard and a wireless cellular communications standard being available, wherein the receive end supports multiple communications standards;
switch, at a data link layer, to using the wireless cellular communications standard for continuous transmission of the service flow, in response to a first switch condition being met, wherein the first switch condition comprises a WLAN communication link failing in communication;
establish a session connection by preferentially using the WLAN communication link, before sending the service flow of the service session to the receive end;
before the session connection is established, communicate with the receive end to determine whether both the transmission apparatus and the receive end support multiple communications standards;
after determining that both the transmission apparatus and the receive end support the multiple communications standards, send, by preferentially using the WLAN communications standard, the service flow of the service session to the receive end; and
after determining that both the transmission apparatus and the receive end support the multiple communications standards, and the session connection is established, allocate storage space to the service flow from a multiple-communications-standard shared storage area, and set a public flag bit for the service flow,
wherein the shared storage area is accessible by the data link layer of the transmission apparatus, and to-be-sent data of the service flow that is processed by a higher layer, is placed in the storage space,
wherein the public flag bit is accessible by the data link layer of the transmission apparatus, and the public flag bit comprises a transmission flag bit, and
wherein a first value of the transmission flag bit identifies that the service flow is completely transmitted, a second value of the transmission flag bit identifies that the service flow is not completely transmitted, and the first value is not equal to the second value.

11. The transmission apparatus according to claim 10, wherein the instructions further comprise instructions to switch, at the data link layer, from using the wireless cellular communications standard to using the WLAN communications standard for continuous transmission of the service flow, in response to a second switch condition being met, and wherein the second switch condition comprises that the WLAN communication link recovers from a communication failed state to a transmission available state.

12. The transmission apparatus according to claim 10, wherein the instructions further comprise instructions to perform matched mapping between a link performance parameter of the WLAN communications standard and a link performance parameter of the wireless cellular communications standard, before performing continuous transmission.

13. The transmission apparatus according to claim 10, wherein the instructions further comprise instructions to delete corresponding to-be-sent data from the storage space in response to an ACK feedback.

14. The transmission apparatus according to claim 10, wherein the instructions further comprise instructions to monitor in real time whether the WLAN communication link fails in communication.

* * * * *